(12) United States Patent
Obeng et al.

(10) Patent No.: US 10,453,032 B1
(45) Date of Patent: Oct. 22, 2019

(54) CUSTOMER SERVICE MANAGEMENT SYSTEM AND METHOD

(71) Applicant: United Services Automobile Association (USAA), San Antonio, TX (US)

(72) Inventors: Quincy Nanaasare Obeng, Plano, TX (US); Brandon Matthew Hurst, Addison, TX (US); Ashley Nicole Munoz, Frisco, TX (US); Peter Thach-Buu Chung, Frisco, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 25 days.

(21) Appl. No.: 15/614,179

(22) Filed: Jun. 5, 2017

Related U.S. Application Data

(60) Provisional application No. 62/346,358, filed on Jun. 6, 2016.

(51) Int. Cl.
*H04M 3/00* (2006.01)
*G06Q 10/10* (2012.01)
*G06Q 30/00* (2012.01)
*H04L 12/26* (2006.01)
*H04M 3/51* (2006.01)
*H04M 3/22* (2006.01)
*H04L 29/08* (2006.01)

(52) U.S. Cl.
CPC ........... *G06Q 10/10* (2013.01); *G06Q 30/016* (2013.01); *H04L 43/065* (2013.01); *H04L 67/12* (2013.01); *H04M 3/22* (2013.01); *H04M 3/51* (2013.01); *H04M 3/5183* (2013.01)

(58) Field of Classification Search
CPC ............ H04M 3/5166; H04M 3/5191; H04M 3/5183; H04M 3/5175; H04M 3/5232; H04M 3/5233; H04M 3/5235; H04M 2203/655; H04M 3/493; H04M 3/523; H04M 2203/402; H04M 2242/28; H04M 3/42068; H04M 2203/40; G06Q 30/016; G06Q 50/01; G06Q 10/063112; G06Q 30/0255; G06Q 30/0281
USPC ............ 379/265.09, 265.13, 265.12, 265.11, 379/265.01, 265.02, 266.02, 266.08, 379/265.1; 370/352, 353
See application file for complete search history.

(56) References Cited

U.S. PATENT DOCUMENTS

| | | | |
|---|---|---|---|
| 9,049,295 B1 * | 6/2015 | Cooper | H04M 3/493 |
| 9,129,290 B2 * | 9/2015 | Kannan | G06Q 30/02 |
| 9,307,085 B1 * | 4/2016 | Hanson | H04M 3/5235 |
| 9,319,522 B1 * | 4/2016 | Webster | H04M 3/493 |

(Continued)

*Primary Examiner* — Ahmad F. Matar
*Assistant Examiner* — Kharye Pope
(74) *Attorney, Agent, or Firm* — Fletcher Yoder, P.C.

(57) ABSTRACT

Embodiments of the present disclosure relate to a method that includes receiving customer identification information, verifying a customer identity using the customer identification information, receiving inputs related to customer intent from a predictive intent module, processing the inputs related to the customer intent to select a customer service representative from a plurality of customer service representatives, delivering the inputs related to the customer intent to the customer service representative, and connecting a customer device to the customer service representative to facilitate an interaction.

13 Claims, 3 Drawing Sheets

(56) References Cited

U.S. PATENT DOCUMENTS

| | | | |
|---|---|---|---|
| 2008/0095355 A1* | 4/2008 | Mahalaha | H04M 3/5233 379/265.09 |
| 2011/0150206 A1* | 6/2011 | Pickford | H04M 3/5183 379/265.09 |
| 2013/0051544 A1* | 2/2013 | Ross | G06Q 50/01 379/265.02 |
| 2014/0044243 A1* | 2/2014 | Monegan | H04M 3/493 379/88.01 |
| 2014/0171034 A1* | 6/2014 | Aleksin | G06Q 30/016 455/414.1 |
| 2014/0365255 A1* | 12/2014 | Burgess | G06Q 30/016 705/7.14 |
| 2015/0193840 A1* | 7/2015 | Punukollu | G06Q 30/0281 705/14.53 |
| 2016/0224524 A1* | 8/2016 | Kay | G06F 17/276 |
| 2017/0195487 A1* | 7/2017 | Bellosi | H04M 3/5175 |

* cited by examiner

CUSTOMER SERVICE MANAGEMENT SYSTEM AND METHOD

CROSS REFERENCE TO RELATED APPLICATIONS

This application claims priority from and the benefit of U.S. Provisional Application Ser. No. 62/346,358, entitled "CUSTOMER SERVICE MANAGEMENT SYSTEM AND METHOD," filed Jun. 6, 2016, which is hereby incorporated by reference.

BACKGROUND

The present disclosure relates generally to systems and methods for automating customer service systems.

Some modern businesses offer an array of customer service options that enable a customer to seek help for questions regarding, for example, interactions between the customer and products offered by the business. Because modern businesses are often diverse, connection between the customer and an appropriate customer service option (e.g., a particular customer service representative and/or department) may be cumbersome, inefficient, and time consuming. Accordingly, it is now recognized that improved routing of the customer to the appropriate customer service option (e.g., representative) is desired.

SUMMARY

The present disclosure relates to a method that includes receiving customer identification information, verifying a customer identity using the customer identification information, receiving inputs related to customer intent from a predictive intent module, processing the inputs related to the customer intent to select a customer service representative from a plurality of customer service representatives, delivering the inputs related to the customer intent to the customer service representative, and connecting a customer device to the customer service representative to facilitate an interaction.

The present disclosure further relates to a customer service management system that includes a database configured to store a plurality of customer data, a network configured to establish communication between the database and a customer device, and a control system communicatively coupled to the network. The control system has one or more tangible, non-transitory machine readable media comprising executable instructions to receive customer identification information from the database, the customer device, or both, verify a customer identity using the customer identification information, receive inputs related to a customer intent from a predictive intent module, process the inputs related to the customer intent, select a customer service representative from a plurality of customer service representatives based on the inputs related to the customer intent, deliver the inputs related to the customer intent to a workstation of the customer service representative, and connect the customer device to the workstation of the customer service representative to initiate an interaction.

The present disclosure further relates to a method that includes receiving customer identification information from a customer device, verifying a customer identity using the identification information, displaying a prompt on the customer device that enables a customer to enter words or phrases, select words or phrases, or both, receiving the words or phrases from the customer device, processing the words or phrases from the customer device to determine a category of customer intent with a predictive intent module, selecting a customer service representative from a plurality of customer service representatives based on the category of the customer intent, delivering the words or phrases from the customer device to the customer service representative, and connecting the customer device to the customer service representative to facilitate an interaction.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
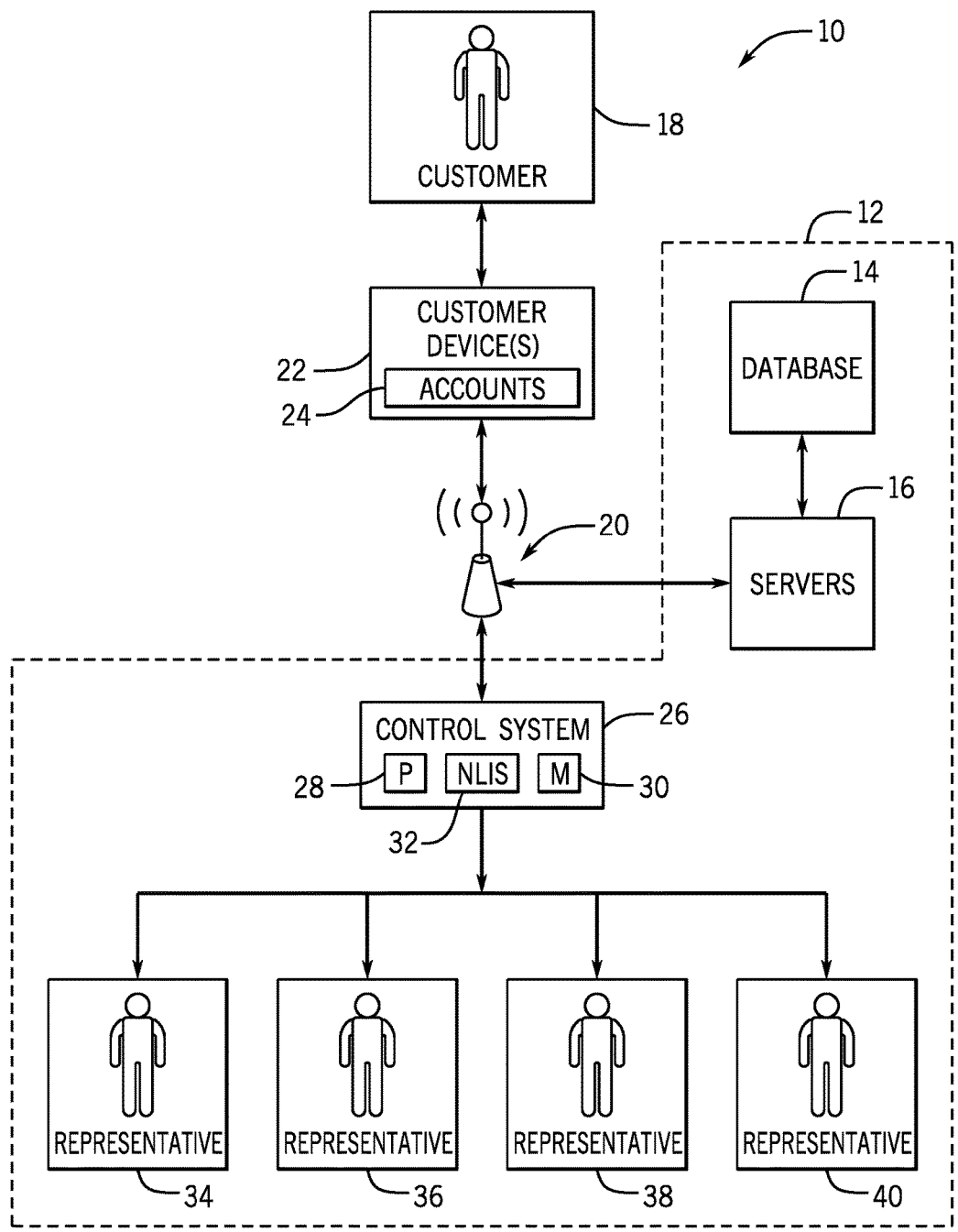
FIG. 1 is a schematic representation of an embodiment of an automated customer service system, in accordance with an aspect of the present disclosure.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Present embodiments are generally directed toward systems and methods for authenticating a customer, determining an intent of the customer, and delivering the intent of the customer to a suitable customer service representative and/or department. For example, modern businesses often offer a diverse array of services to customers. Further, modern businesses often consolidate customer service support as a cost-saving measure. Unfortunately, traditional customer service systems may be cumbersome and/or time-consuming to navigate for customers. For example, in traditional customer service systems, the customer may initially reach an automated voice system, which may be inaccurate and time-consuming. Further, once the customer reaches a customer service representative, the customer may be asked a series of identifying questions to verify the customer's identity. This customer verification process may increase the time a customer spends resolving a problem or completing a request. The verification process may also be inconvenient and/or irritating for the customer as the customer may not have the information requested by the customer service representative readily available.

Additionally, traditional customer service systems may prompt a customer to select from broad categories (e.g., via the automated voice system), thereby producing long wait times and/or directing the customer to a customer service representative who is unprepared (e.g., lacks the knowledge and/or experience) to handle the customer's particular problem and/or request. Accordingly, it may be desirable to accurately identify the intent of the customer based on information input or gathered from the customer to quickly direct the customer to a suitable customer service representative. Identifying the intent of the customer and directing the customer to the appropriate customer service representative may thus reduce the time the customer spends resolving the problem or completing the request.

Further, even when the customer does reach a suitable customer service representative, the customer may be prompted to provide specific details regarding the customer's problem and/or request. It is now recognized that it may be desirable to gather and/or provide the customer service representative with preliminary information related to the customer's problem and/or request before the customer is connected to (e.g., interacts with) the customer service representative. For example, in some embodiments, a system may gather information from and/or input into a device (e.g., a cellular phone, a tablet computer, and/or another computing device) that may indicate the intent of the customer for contacting the customer service representative. Providing such information to the customer service representative may prepare the customer service representative to address the customer's problem and/or request, thereby reducing an amount of time that the customer may spend interacting with the customer service representative. In some cases, the information related to the customer and/or the customer intent may be delivered to a workstation (e.g., a computer, a laptop, a mobile phone, a tablet, another computing device, or a combination thereof) of the customer service representative, such that the customer service representative may view the customer information and/or customer intent before and/or during the interaction.

Accordingly, present embodiments are generally directed to improved automated systems and methods for routing customers to customer service representatives and/or departments of a business customer service system. More specifically present embodiments are directed to improved automated systems and methods for reducing a customer's wait time and/or an interaction time with the customer service representative. For example, embodiments of the present disclosure relate to a customer service system that verifies an identity of the customer before the customer is connected to a customer service representative, interactively determines the customer intent before the customer calls the customer service system, and delivers the customer intent and/or information related to the customer's problem and/or request before the customer is directed to the customer service representative.

To help illustrate the manner in which the present embodiments may be used in a system, FIG. 1 is a schematic representation of an embodiment of a system 10 having a local customer service system 12 owned and/or operated by a business. In the illustrated embodiment, the local customer service system 12 may include a database 14 configured to store a variety of information (e.g., client data). For example, the database 14 may be hosted on servers 16 owned and/or operated by the business. A customer 18 of the business may open or update a customer account that is stored on the servers 16 and in the database 14. For example, the servers 16 may be communicatively coupled to a network 20, and the customer 18 may access the servers 16 (and the database 14 thereof) by communicating over the network 20. The customer 18 may utilize a customer device 22 (e.g., a smart phone, a computing tablet, a laptop, a wearable device, another computing device, or some other customer interface device [CID]) communicatively coupled to the network 20 to access the customer account via a website and/or mobile application (e.g., software that may access the database 14 and/or the server 16 over the network 20) owned or operated by the business. In some embodiments, the web site and/or mobile application is hosted by the servers 16 and is configured to enable modification of, and/or access to, customer account information stored in the database 14.

In some embodiments, the business may automatically enter information into (or register/open) the customer account of the customer 18. Further, the customer 18 and/or the customer device 22 (e.g., a smart phone, a computing tablet, a laptop, a wearable device, another computing device, or some other customer interface device [CID]) may enter information into the customer account. For example, the customer account may receive, from the customer 18 or the customer device 22 (e.g., automatically), information relating to demographics (e.g., age, race, and ethnicity) of the customer 18. Additionally, the customer account may receive information relating to financial events (e.g., addition of a new stream of income, addition of a new debt, a raise, a lay-off), family events (e.g., engagement, marriage, divorce, birth of a new child), medical events (e.g., a recent medial emergency such as a heart attack, a doctor visit, a doctor evaluation), educational events (e.g., graduation, enrollment, application), and other information or events.

As previously described, the customer account stored to the database 14 may receive information manually entered by the customer 18 (or by a third party, such as an administrator). However, the customer account may receive customer information (e.g., personal data, identification data, and/or intent data) a number of other ways. For example, the customer account saved to the database 14 (e.g., stored on the servers 16) may be linked (e.g., with permission from the customer 18, depending on the embodiment) to the customer devices 22 and/or accounts 24 associated with the customer devices 22 (e.g., social media accounts, bank accounts, health related accounts, or other accounts). In some embodiments, the accounts 24 may automatically send customer information (and/or associated data) to the servers 16 (and the database 14 thereof) by accessing the servers 16 via the network 20. For example, wearable devices that may be worn by the customer 18 may automatically send data over the network 20 to the database 14 on the servers 16. In some cases, the wearable devices may be configured to monitor and/or determine health data (e.g., heartbeat, body temperature, movement, blood sugar levels, body mass index, breathing patterns, height, weight, or a combination thereof) of the customer 18 and send the health data to the database 14.

Additionally or alternatively, the servers 16 (or some other component of the system 10) may scrub or scan the customer devices 22 and/or the accounts 24 associated with the customer devices 22 for customer information (e.g., data). For example, software of the system 10 or local customer service system 12 (e.g., software stored on the servers 16) may scan or scrub the customer devices 22 and/or the accounts 24 for relevant customer information, and store the relevant customer information to the customer account in the database 14 hosted by the servers 16. In some embodiments, the software may be configured to acquire and/or store a location of the customer 18 (e.g., home, work, school, or other frequently visited locations), physical identifiers of the customer 18 (e.g., fingerprints, voice pitch or tone, facial features, odor, speech patterns, other physical identifiers, or a combination thereof), behavioral or habitual information related to the customer 18 (e.g., movement tendencies, location data over time, usage of the customer devices 22 and/or the accounts 24, mobile applications used after unlocking a customer device 22, data related to customer interaction with the customer devices 22, or a combination thereof), and/or call data (e.g., persons that the customer 18 frequently calls and/or recent calls) from previous or real-time calls. Such information may be added and stored in the database 16 to enable the system 10 to verify the identity of the customer 18 and/or predict an intent of the customer 18 (e.g., a reason that the customer 18 is accessing the server 20).

During the customer's engagement with the business, the customer 18 may come across a question, a concern, or an action of which the customer 18 seeks assistance. Accordingly, the customer 18 may access the network 20 (or some other network) via the customer device 22. For example, the customer 14 may utilize a telecommunication device such as a cell phone to call the local customer service system 12. Additionally, the customer 14 may utilize the cell phone and/or a tablet to access a mobile application linked to the local customer service system 12 (e.g., via the servers 16). In other embodiments, the customer 18 may utilize a telecommunication device, a computing device, and/or a laptop to email or message the local customer service system 12. Accordingly, "local customer service system," as used herein, refers to a system operated by the business and configured to interact with the customer 18 (e.g., via a phone call, a text, an email, or a chat message).

In certain embodiments, a control system 26 of the local customer service system 12 may contact the customer 18 when the customer 18 connects to the network 20 using the customer device 22. The control system 26 may include one or more processors 28 (e.g., processing circuitry) and one or more memory 30 (e.g., memory circuitry). A program may be stored in the memory 30, where the program includes a set of instructions that, when executed by the processor 28, cause the control system 26 to carry out certain functions. Upon notice that the customer 18 has connected to the network 20 (i.e., the customer has used the customer device 22 to communicate via the network 20), the control system 26 may retrieve and/or receive information from the customer device 22 (e.g., a phone number, an e-mail address, an internet protocol (IP) address, a real-time or recent activity, a location, or other information of the customer 18). Accordingly, the control system 26 may be configured to verify an identity of the customer 18 using the information received from the customer device 22. For example, the control system 26, which is communicatively coupled to the network 20 over which the customer 18 contacts the control system 26, may access the servers 16 via the network 20 to search the database 14 for a customer account associated with the phone number, e-mail address, and/or IP address of the customer device 22 used to connect to the network 20. After locating the customer account associated with the phone number, e-mail address, and/or IP address of the customer device 22 (e.g., by matching the phone number, e-mail address, and/or IP address of the customer device 22 with the phone number, e-mail address, and/or IP address listed in the customer's account), the control system 26 may verify the customer's identity automatically.

In some embodiments, the control system 26 may utilize an identity verification parameter in addition to or in lieu of the customer's phone number, e-mail address, and/or IP address. As a non-limiting example, the control system 26 may determine a location of the customer 18 based on information received from the customer device 22. The control system 26 may then compare the location of the customer 18 to location data (e.g., frequently visited locations of the customer 18) stored in the database 14 to verify that the message received was generated by the customer 18, and not an imposter who has possession of the customer device 22. In other embodiments, the control system 26 may determine behavioral information based on information received from the customer device 22. For example, the control system 26 may determine which mobile applications the customer 18 accessed before sending the message to the control system 26. The control system 26 may compare the behavioral information to behavioral data stored in the database 14 to verify the identity of the customer 18.

Further, when the control system 26 cannot verify the identity of the customer 18 (e.g., based on the phone number, the e-mail address, the IP address, and/or another verification parameter), the control system 26 may prompt (e.g., via an automated voice, sound, or image) the customer 18 to manually input (e.g., by speaking and/or typing) additional identification verification. In some embodiments, the control system 26 may prompt the customer 14 for identification verification even if the phone number, e-mail address, and/or IP address of the customer device 22 matches the phone number, e-mail address, and/or IP address associated with the customer account saved in the database 14. For example, the control system 26 may prompt the customer 18 to input (e.g., by speaking and/or typing) the customer's social security number, account number (e.g., of the customer account), and/or other identification verification information (e.g., answers to security questions associated with the customer account).

After verifying the identity of the customer 18, the control system 26 may access the customer's account in the database 14. In some embodiments, the control system 26 may utilize an algorithm to predict an intent of the customer 18 for connecting to the network 20 e.g., a predictive intent module). For example, the control system 26 may utilize information received from the customer device 22 and compare the information with stored customer information in the database 14. For example, the information received from the customer device 22 may include information related to a most recent action performed by the customer 18 on the customer device 22.

Accordingly, when the most recent action performed by the customer 18 on the customer device 22 is a phone call to a tow-truck company, the control system 26 may predict that the intent of the customer 18 is related to automobile insurance. Similarly, when the most recent action performed by the customer 18 is a social media post related to a job promotion, the control system 26 may predict that the intent of the customer 18 is related to financial services. In any event, the control system 26 may automatically predict a most likely intent of the customer 18 for connecting to the server 20 based on information received from the customer device 22 and/or data stored in the database 14 (e.g., a predictive intent module).

In some cases, the control system 26 may display and/or otherwise indicate to the customer 18, the predicted intent of the customer 18. The customer 18 may then indicate whether the predicted intent is accurate or inaccurate. When the predicted intent of the customer 18 is accurate, the control system 26 may place the customer 18 in a queue associated with the specific intent of the customer. However, when the predicted intent of the customer 18 is not accurate (or when the intent is partially accurate), the control system 26 may prompt the customer 18 for additional information. For example, control system 26 may utilize a natural language intent system 32 (e.g., a sub-system of the control system 26 and/or a predictive intent module) to prompt the customer 18 to provide details related to the customer's intent for sending the message. Additionally, the control system 26 may utilize the natural language intent system 32 in lieu of predicting the intent of the customer. The natural language intent system 32 is described in more detail below with reference to FIG. 2. In other embodiments, the control system 26 may determine the intent of the customer 18 by prompting the customer 18 to input (e.g., via a keyboard and/or a voice command) the intent of the customer 18. Once the control system 26 confirms the intent of the customer 18 or learns the intent of the customer 18 utilizing the natural language intent system 32, the control system 26 may place the customer 18 in the queue associated with the specific intent of the customer 18.

In some cases, the control system 26 may determine that all qualified representatives capable of handling the customer's issue and/or request (e.g., all representatives associated with queue related to the specific intent of the customer 18) are unavailable. Accordingly, the control system may maintain the customer 18 in the queue. When a qualified representative becomes available, the control system 26 may route the customer 18 accordingly.

As described above, the control system 26 may route the customer 18 to a customer service representative (e.g., representative 34, 36, 38, and/or 40) that is equipped (e.g., trained) to handle the customer's intent. Some customer service representatives 34, 36, 38, and/or 40 may be trained to handle, for example, one or more intents of the customer 18. For example, the customer service representative 34 may be equipped (e.g., trained) to handle financial services or specific subcategories thereof. The customer service representative 36 may be equipped (e.g., trained) to handle medical events or specific subcategories thereof. The customer service representative 38 may be equipped (e.g., trained) to handle family events or specific subcategories thereof. Any number of representatives may exist, each representative being equipped to handle one or more intent category. In certain embodiments, each representative 34, 36, 38, and 40 may be equipped (e.g., trained) to handle issues associated with one or more particular categories (e.g., types) of intents.

By training representatives 34, 36, 38, and 40 to handle particular categories of intents, in conjunction with identifying the intent of the customer 18, the local customer service system 12 may route the customer 18 (connect the customer's call) with reduced (or no) interaction between the customer 18 and, for example, an automated voice system. In other words, the control system 18 may be capable of routing the customer 18 more quickly and more efficiently. Accordingly, technical limitations of automated voice systems (e.g., voice recognition software) may be avoided.

Figure 2:
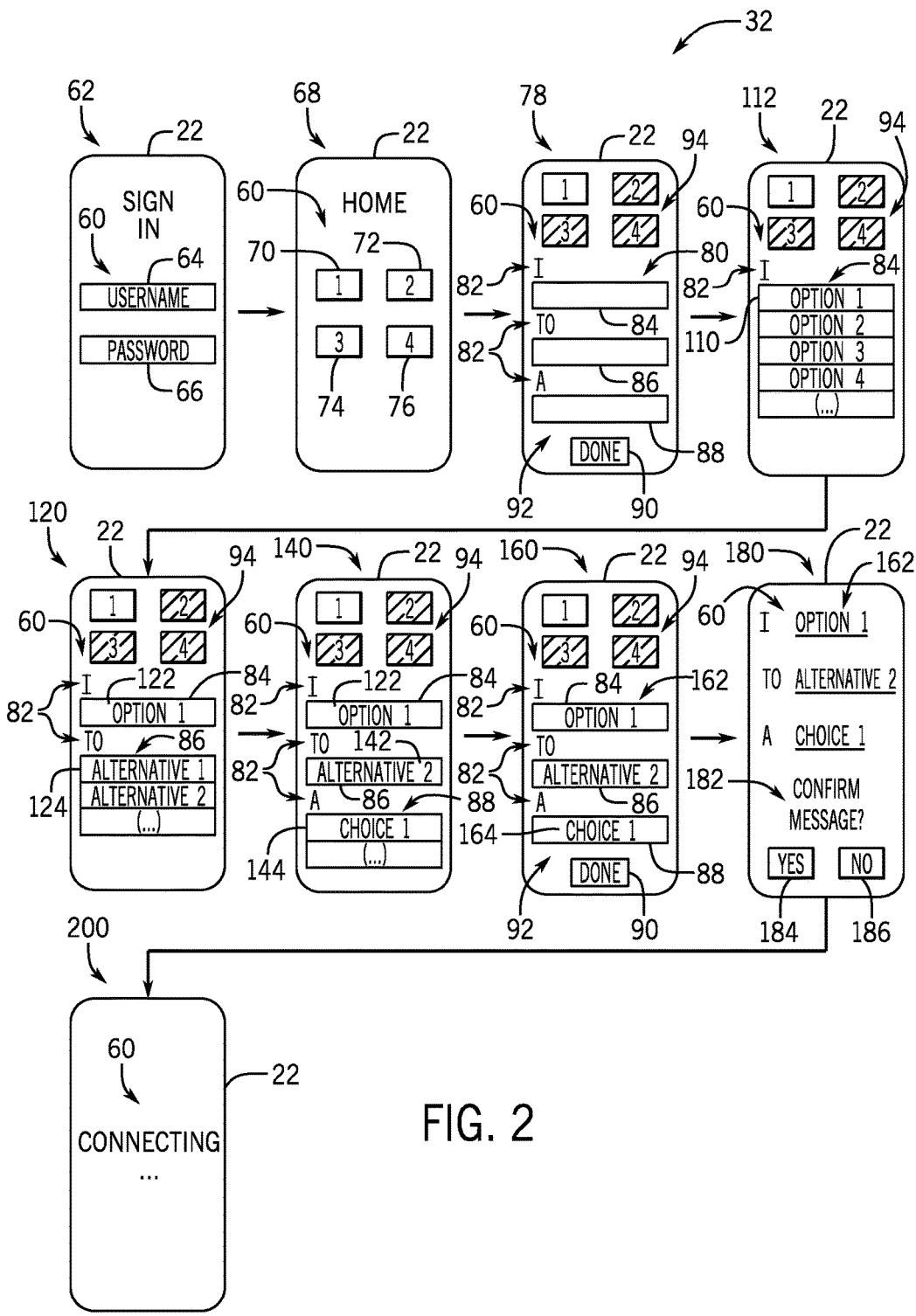
FIG. 2 is a block flow diagram of an embodiment of a natural language intent system that may be utilized to determine an intent of a customer for contacting the automated customer service system, in accordance with an aspect of the present disclosure.

FIG. 2 is a block flow diagram of the natural language intent system 32 that may be utilized to determine the intent of the customer 18 (e.g., either in addition to or in lieu of the control system 26 predicting the intent of the customer). As shown in the illustrated embodiment of FIG. 2, the customer device 22 may include a display 60 configured to enable the customer 18 to interact with the natural language intent system 32, such that the control system 26 may determine the intent of the customer 18. For example, a first interactive display 62 may be a sign-in or log-on prompt of the natural language intent system 32 and/or a mobile application of the business. The customer 18 may be directed to input a username into a username box 64 and/or a password into a password box 66 (e.g., via a keyboard and/or a voice command) to verify the customer's identity and to retrieve information associated with an account of the customer 18. Additionally, as discussed above, the control system 26 may verify the customer's identity using a phone number, e-mail address, IP address, and/or other verification information received from the customer device 22. It should be noted that the natural language intent system 32 may be initiated and operate in parallel with a voice call (e.g., a telephone call).

Once the natural language intent system 32 has verified the customer's identity, a second interactive display 68 may appear on the display 60 of the customer device 22. In some embodiments, the second interactive display 68 may be a "home" screen (e.g., a welcome page and/or a directory of the business's mobile application or website) of the natural language intent system 32 that prompts the customer 18 to select a general topic related to the intent of the customer 18. For example, the second interactive display 64 may include a first topic 70, a second topic 72, a third topic 74, and/or a fourth topic 76. While the illustrated embodiment of FIG. 2 illustrates the second interactive display 68 having four topics, the second interactive display 68 may include fewer than four topics (e.g., 3, 2, or fewer topics) or more than four topics (e.g., 5, 6, 7, 8, 9, 10, or more topics). The customer 18 may select one or more of the topics 70, 72, 74, and/or 76 by touching, clicking, and/or vocally selecting the topic 70, 72, 74, and/or 76 that corresponds to the intent of the customer.

The natural language intent system 32 may present a third interactive display 78 on the display 60 of the customer device 22 when the customer 18 selects one of the topics 70, 72, 74, and/or 76. The third interactive display 78 may include a natural language skeleton 80 (e.g., not filled out) that pertains to the topic 70, 72, 74, and/or 76 selected by the customer 18. For example, the natural language skeleton 80 may be in sentence form to facilitate expression and/or description of the intent of the customer 18. The natural language skeleton 80 may include preset words 82 (e.g., fixed words) that are predetermined, such that the customer 18 may not select and/or input the preset words 82. In some embodiments, the preset words 82 may provide guidance to the customer 18 when forming a natural language sentence describing the intent of the customer 18. For example, as shown in the illustrated embodiment, the third interactive display 78 may include the preset words 82 "I," "to," and "a," to provide the customer 18 with a direction in expressing the intent. In other embodiments, the customer 18 may select from a list of preset words 82 based on the intent of the customer 18.

Additionally, each of the preset words 82 may correspond to and/or otherwise be associated with an input box. As shown in the illustrated embodiment, the third interactive display 78 includes a first input box 84, a second input box 86, and a third input box 88. In some embodiments, the input boxes 84, 86, and/or 88 may be dropdown boxes that enable that the customer to select from a variety of options, alternatives, or choices. In other embodiments, the input boxes 84, 86, and/or 88 may be text input boxes that receive text that the customer 18 types into the input boxes 84, 86, and/or 88. In still further embodiments, the input boxes 84, 86, and/or 88 may be configured to access a microphone of the customer device 22, such that the customer 22 may input text into the input boxes 84, 86, and/or 88 through vocal commands. When the customer enters a word or phrase and/or selects an option, alternative, or choice from the input boxes 84, 86, and/or 88, the preset words 82 may change based on the word or phrase entered and/or the option, alternative, or choice selected by the customer 18. Accordingly, the natural language intent system 32 may generate a natural language sentence that expresses the intent of the customer in a simple, yet informative, sentence. While the illustrated embodiment of FIG. 2 shows the third interactive display 78 having three preset words 82 and three input boxes 84, 86, and 88, it should be recognized that the third interactive display 78 may include any suitable number of the preset words 82 and any suitable number of the input boxes 84, 86, and/or 88.

Additionally, an advancement box 90 (e.g., labeled "done") may be located at a bottom portion 92 of the display 60 of the customer device 22 in the third interactive display 78. The advancement box 90 may be selected (e.g., pressed and/or clicked on) by the customer 18 once the natural language sentence has been completed. In some embodiments, the advancement box 90 may be un-selectable (e.g., grayed out) until the customer 18 has input and/or selected a word or phrase in each of the input boxes 84, 86, and/or 88. In other embodiments, the advancement box 90 may be selectable even when the input boxes 84, 86, and/or 88 do not include an input and/or selected word or phrase.

In some embodiments, the third interactive display 78 may show which of the topics 70, 72, 74, and/or 76 that the customer 18 selected from the second interactive display 68, such that the customer 18 may visually confirm that appropriate topic was selected. For example, a top portion 94 of the display 60 of the customer device 22 may show the four topics 70, 72, 74, and/or 76, where the selected topic is highlighted and/or brighter than the non-selected topics (e.g., the non-selected topics may be grayed out).

As discussed above, the first input box 84 may include a first dropdown box 110 as shown in a fourth interactive screen 112. As shown in the illustrated embodiment of FIG. 2, the customer 18 may touch and/or click on the first input box 84, thereby prompting the first input box 84 to provide various options in the fourth interactive screen 112. The first dropdown box 110 may cover the second input box 86 and/or the third input box 88, such that the customer 18 may view multiple options for the first input box 84 at one time. The customer 18 may then select an option from the various options included in the first dropdown box 110 that corresponds with the intent of the customer 18. In some embodiments, the first dropdown box 110 may include between 1 and 50 options, between 2 and 25 options, or between 5 and 10 options that the customer 18 may choose between. Accordingly, the first dropdown box 110 may be configured such that the customer 18 may scroll between the various options to determine which option is consistent with the intent of the customer 18.

In certain embodiments, the first dropdown box 110 may be configured to position certain options higher on a list of the options (e.g., the customer 18 may not scroll as far to find such options). For example, the natural language intent system 32 may predict an option that may correspond to the intent of the customer 18 based on information stored in the database 14 and/or information received from the customer device 22. Therefore, options that may be most relevant to the customer 18 may be quickly visible to the customer 18, thereby reducing a time that it takes the customer 18 to create the natural language sentence.

At a fifth interactive display 120, the selected option 122 of the customer 18 may be visible in the first input box 84. Additionally, the second input box 86 may include a second dropdown box 124 as shown in the fifth interactive screen 120. As shown in the illustrated embodiment of FIG. 2, the customer 18 may touch and/or click on the second input box 86, thereby prompting the second input box 86 to provide various alternatives to the customer 18 for the second input box 86 (e.g., related to the selected option 122 of the first input box 84). The second dropdown box 124 may cover the third input box 88, such that the customer 18 may view multiple alternatives for the second input box 86 at one time. In other embodiments, the second dropdown box 124 may also cover the first input box 84 to enable the customer 18 to view even more alternatives for the second input box 86 at one time. The customer 18 may then select an alternative from the various alternatives included in the second dropdown box 124 that corresponds with the intent of the customer 18. In some embodiments, the various alternatives presented in the second dropdown box 124 may be based on the selected option 122 from the first input box 84. In other embodiments, the various alternatives may not differ between the various options from the first input box 84. The second dropdown box 124 may include between 1 and 50 alternatives, between 2 and 25 alternatives, or between 5 and 10 alternatives that the customer 18 may choose between. Accordingly, the second dropdown box 124 may be configured such that the customer 18 may scroll between the various alternatives to determine which alternative is consistent with the intent of the customer 18.

In certain embodiments, the second dropdown box 124 may be configured to position certain alternatives higher on a list of the alternatives (e.g., the customer 18 may not scroll as far to find such alternatives). For example, the natural language intent system 32 may predict an alternative that may correspond to the intent of the customer 18 based on information stored in the database 14, information received from the customer device 22, and/or the selected option 122 from the first input box 84. Therefore, alternatives that may be most relevant to the customer 18 may be quickly visible to the customer 18, thereby reducing a time that it takes the customer 18 to create the natural language sentence.

At a sixth interactive display 140, the selected option 122 and a selected alternative 142 of the customer 18 may be visible in the first input box 84 and the second input box 86, respectively. Additionally, the third input box 88 may include a third dropdown box 144 as shown in the sixth interactive screen 140. As shown in the illustrated embodiment of FIG. 2, the customer 18 may touch and/or click on the third input box 88, thereby prompting the third input box 88 to provide various choices to the customer 18 for the third input box 88. In some embodiments, the third dropdown box 144 may cover the first input box 84 and/or the second input box 86, such that the customer 18 may view multiple choices for the third input box 88 at one time. The customer 18 may then select a choice from the various choices included in the third dropdown box 144 that corresponds with the intent of the customer 18. In some embodiments, the various choices presented in the third dropdown box 144 may be based on the selected option 122 from the first input box 84 and/or the selected alternative 142 from the second input box 86. In other embodiments, the various choices may not differ between the various options from the first input box 84 and/or the various alternatives from the second input box 86. The third dropdown box 144 may include between 1 and 50 choices, between 2 and 25 choices, or between 5 and 10 choices that the customer 18 may choose between. Accordingly, the third dropdown box 144 may be configured such that the customer 18 may scroll between the various choices to determine which choice is consistent with the intent of the customer 18.

In certain embodiments, the third dropdown box 144 may be configured to position certain choices higher on a list of the choices (e.g., the customer 18 may not scroll as far to find such choices). For example, the natural language intent system 32 may predict a choice that may correspond to the intent of the customer 18 based on information stored in the database 14, information received from the customer device 22, the selected option 122 from the first input box 84, and/or the selected alternative 142 from the second input box 86. Therefore, choices that may be most relevant to the customer 18 may be quickly visible to the customer 18, thereby reducing a time that it takes the customer 18 to create the natural language sentence.

Once the customer 18 has entered and/or selected a word or phrase for each of the input boxes 84, 86, and/or 88, a seventh interactive display 160 may show a complete natural language sentence 162. For example, the seventh interactive display 160 may include the selected option 122 in the first input box 84, the selected alternative 142 in the second input box 86, and/or a selected choice 164 in the third input box 88. Accordingly, the customer 18 may press and/or click the advancement box 90 to advance toward an interaction with the customer service representative 34, 36, 38, or 40.

In some embodiments, an eighth interactive display 180 may request that the customer 18 verify the complete natural language sentence 162 before addressing the intent of the customer 18 (e.g., connecting the customer 18 with the customer service representative 34, 36, 38, or 40). For example, the eighth interactive display 180 may show the complete natural language sentence 162, but not include the input boxes 84, 86, and/or 88. Therefore, the customer 18 may not change the complete natural language sentence 162 in the eighth interactive display 180 (e.g., the customer 18 may still change the complete natural language sentence at the seventh interactive display 160). In some embodiments, the eighth interactive display may emphasize the selected option 122, the selected alternative 142, and/or the selected choice 164 (e.g., via underlined text, bold text, highlighted text, or another suitable emphasis technique), such that the customer 18 may review the selected option 122, the selected alternative 142, and/or the selected choice 164 and confirm that such selections are consistent with the intent of the customer 18.

Accordingly, the eighth interactive display 180 may include a confirmation question 182 requesting that the customer 18 confirm that the selections 122, 142, and/or 164 correspond to the intent (e.g., problem, issue, and/or request) of the customer 18. The eighth interactive display 180 may include a confirmation box 184 and a disapproval box 186 that the customer 18 may select. When the customer 18 believes that the complete natural language sentence 162 is consistent with the intent of the customer 18, the customer 18 may press and/or click the confirmation box 184. When the customer 18 does not believe that the complete natural language sentence 162 is consistent with the intent of the customer 18 (e.g., the customer made a mistake selecting the selected option 122, the selected alternative 142, and/or the selected choice 164), the customer 18 may press or click the disapproval box 186, which may direct the customer 18 back to the seventh interactive display 160.

When the customer 18 presses, clicks, and/or vocally selects the confirmation box 184, a ninth interactive display 200 may be visible on the display 60 of the customer device 22. As shown in the illustrated embodiment of FIG. 2, the ninth interactive display 200 may indicate to the customer 18 that the system 10 is connecting the customer 18 to a suitable customer service representative 34, 36, 38, or 40 based on the complete natural language sentence 162. Accordingly, the customer 18 may interact with (e.g., talk to, message, or otherwise communicate with) the customer service representative 34, 36, 38, or 40 once connected. In some embodiments, the customer service representative 34, 36, 38, or 40 may receive the complete natural language sentence 162 and/or additional information related to the customer 18 on a workstation (e.g., a computer, a laptop, a mobile phone, a tablet, another computing device, or a combination thereof) before the customer 18 and the customer service representative 34, 36, 38, or 40 are connected to one another. Therefore, the customer service representative 34, 36, 38, or 40 may prepare to address the customer intent before interacting with the customer 18, which may reduce the time that the customer 18 waits before solving a problem and/or before completing a request.

In other embodiments, when the customer 18 presses, clicks, and/or vocally selects the confirmation box 184, the customer 18 may be directed to an appropriate division of the mobile application and/or website of the business. Accordingly, the customer 18 may attempt to resolve the problem and/or fulfill the request before interacting with the customer service representative 34, 36, 38, or 40. In still further embodiments, the customer 18 may select whether to address the intent of the customer 18 manually (e.g., through the mobile application and/or website of the business) or through interaction with the customer service representative 34, 36, 38, or 40 after selecting the confirmation box 184. Accordingly, in some embodiments, the customer 18 may choose to resolve the problem and/or fulfill the request without interacting with the customer service representative 34, 36, 38, or 40.

Figure 3:
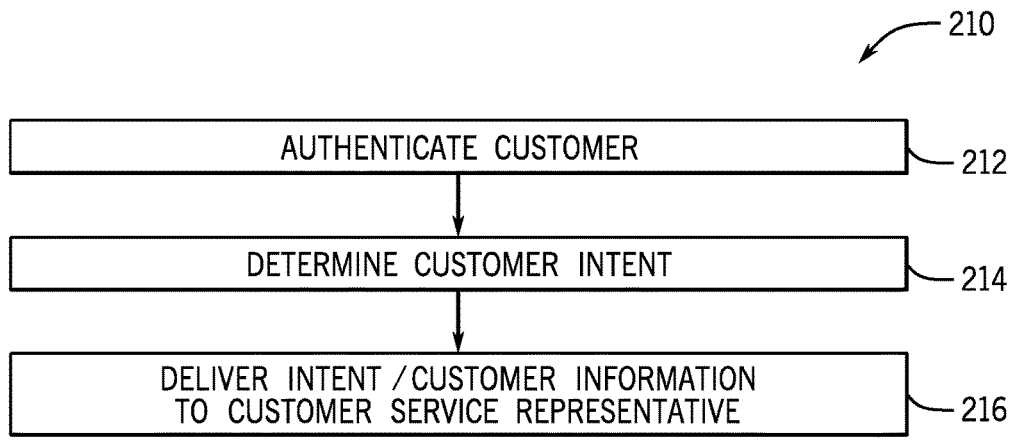
FIG. 3 is a flow chart of an embodiment of a process that may be executed by the automated customer service system, in accordance with an aspect of the present disclosure.

FIG. 3 is an overall flow chart of a process 210 that may be performed by the control system 26 to facilitate directing the customer 18 to the customer service representative 34, 36, 38, or 40 and to reduce the time that the customer 18 waits before resolving a problem and/or completing a request. For example, at block 212, the control system 26 may be configured to authenticate the customer 18. As discussed above, the control system 26 may be configured to verify an identity of the customer 18 by searching the database 14 for a customer account associated with the phone number, e-mail address, and/or internet protocol (IP) address of the customer device 22. After locating the customer account associated with the phone number, e-mail address, and/or IP address of the customer device 22 (e.g., by matching the phone number, e-mail address, and/or IP address of the customer device 22 with the phone number, e-mail address, and/or IP address listed in the customer's account), the control system 26 may verify the customer's identity automatically.

Additionally, the control system 26 may utilize an identity verification parameter in addition to, or in lieu of, the customer's phone number, e-mail address, and/or IP address. As a non-limiting example, the control system 26 may determine a location of the customer 18 based on information received from the customer device 22. The control system 26 may then compare the location of the customer 18 to location data (e.g., frequently visited locations of the customer 18) stored in the database 14 to verify that the customer 18, and not an imposter, has possession of the customer device 22. In other embodiments, the control system 26 may determine behavioral information based on information received from the customer device 22. For example, the control system 26 may determine which mobile applications the customer 18 accessed before connecting to the network 20. The control system 26 may compare the behavioral information to behavioral data stored in the database 14 to verify the identity of the customer 18.

Further, when the control system 26 cannot verify the identity of the customer 18 (e.g., based on the phone number, the e-mail address, the IP address, and/or another verification parameter), the control system 26 may prompt (e.g., via an automated voice, sound, or image) the customer 18 to manually input (e.g., by speaking and/or typing) additional identification verification. In some embodiments, the control system 26 may prompt the customer 14 for identification verification even if the phone number, e-mail address, and/or IP address of the customer device 22 matches the phone number, e-mail address, and/or IP address associated with the customer account saved in the database 14. For example, the control system 26 may prompt the customer 18 to input (e.g., by speaking and/or typing) the customer's social security number, account number (e.g., of the customer account), and/or other identification verification information (e.g., answers to security questions linked to the customer's account).

Once the control system 26 has verified the identity of the customer 18, the control system 26 may determine the intent of the customer, as shown at block 214. This may be performed using a predictive intent module of the control system 26. As discussed above, the intent of the customer may be predicted by the control system 26 (e.g., the predictive intent module) or determined via the natural language intent system 32. In some embodiments, the control system 26 may utilize an algorithm incorporated into and/or controlled by the predictive intent module, which may include computer executable code, to predict the intent of the customer 18. For example, the control system 26 may utilize information received from the customer device 22 and compare the information with stored customer information in the database 14. For example, the information received from the customer device 22 may include information related to a most recent action performed by the customer 18 on the customer device 22. Accordingly, when the most recent action performed by the customer 18 on the customer device 22 is a phone call to a tow-truck company, the control system 26 may predict that the intent of the customer 18 is related to automobile insurance. Similarly, when the most recent action performed by the customer 18 is a social media post related to a job promotion, the control system 26 may predict that the intent of the customer 18 is related to financial services. In any event, the control system 26 may automatically predict a most likely intent of the customer 18 based on information received from the customer device 22 and/or data stored in the database 14. Additionally, as discussed in detail above with reference to FIG. 2, the control system 26 may utilize the natural language intent system 32 to determine the intent of the customer. The predictive intent module may be employed to receive initial selections in the natural language intent system 32 and suggest initial selections for subsequent entries based on predictions. Further, the control system 26 may prompt the customer 18 to manually input the intent via a keyboard, voice commands, topic selections (e.g., buttons or links), or any other suitable input technique. Such prompts may also incorporate suggestions from the predictive intent module.

At block 216, the control system 26 may be configured to deliver information related to the intent of the customer 18 to the customer service representative 34, 36, 38, or 40 (e.g., a workstation of the customer service representative 34, 36, 38, or 40) before connecting the customer 18 to the customer service representative 34, 36, 38, or 40. Therefore, the customer service representative 34, 36, 38, or 40 may prepare to address the customer intent before interacting with the customer 18, which may reduce the time that the customer 18 waits before solving a problem and/or completing a request.

Figure 4:
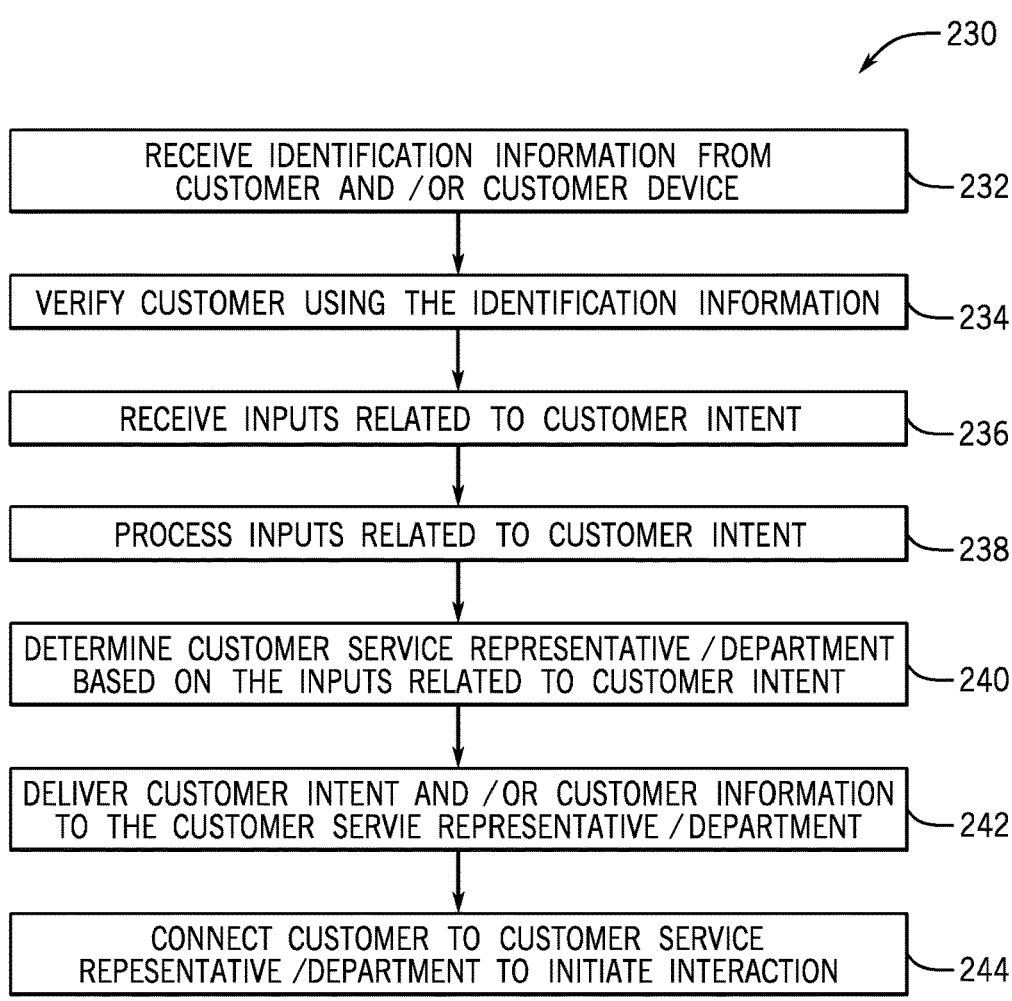
FIG. 4 is a flow chart of an embodiment of a process that may be executed by the automated customer service system, in accordance with an aspect of the present disclosure.

FIG. 4 is a detailed flow chart of a process 230 that may be performed by the control system 26 to facilitate directing the customer 18 to the customer service representative 34, 36, 38, or 40 and to reduce the time that the customer 18 waits before resolving a problem and/or completing a request. For example, at block 232 the control system 26 may receive identification information from the customer 18 and/or the customer device 22. As discussed above, the identification information may include the phone number, e-mail address, or IP address of the customer device 22 connected to the server and/or other verification information. The control system 26 may utilize the identification information to verify the customer, as shown at block 234. For example, the control system 26 may compare the identification information to customer information stored in the database 14 and associated with the customer's account.

Once the customer's identity has been verified, the control system 26 may be configured to receive inputs related to the intent of the customer, as shown at block 236. For example, the control system 26 may receive the complete natural language sentence 162 from the natural language intent system 32, customer information indicative of the intent input by the customer 18, customer information indicative of the intent received from the customer device 22, customer information indicative of intent predicted by the control system 26, and/or customer information indicative of intent from the database 14.

The control system 26 may then process the inputs related to the customer intent at block 238. For example, the control system 26 may analyze (e.g., using an algorithm) multiple inputs to determine an overall intent of the customer 18. Accordingly, the control system 26 may determine and/or select a suitable customer service representative 34, 36, 38, or 40 that has adequate training to address the intent of the customer 18, as shown at block 240. Should the suitable customer service representative 34, 36, 38, or 40 be unavailable, the control system 26 may be configured to place the customer 18 on hold until the suitable customer service representative 34, 36, 38, or 40 is available. However, despite the fact that the suitable customer service representative 34, 36, 38, of 40 may not be immediately available to interact with the customer 18, the system 10 may still reduce wait times of the customer 18. For example, by grouping the customer service representatives 34, 36, 38, or 40 by categories of customer intent, the business may employ a greater number of customer service representatives for those customer intents that occur more frequently than others. Therefore, wait times for the customer 18 may be reduced.

Further, the time that it takes the customer intent to be resolved (e.g., the problem to be addressed or a request to be fulfilled) may be reduced by delivering information related to the customer intent (e.g., the completed natural language sentence 162 and/or information from the customer device 22) to the customer service representative 34, 36, 38, or 40 (e.g., a workstation of the customer service representative 34, 36, 38, or 40), as shown at block 242. In some embodiments, the information related to the customer intent may be delivered to the customer service representative 34, 36, 38, or 40 (e.g., a workstation of the customer service representative 34, 36, 38, or 40) before the customer 18 is connected with the customer service representative 34, 36, 38, or 40. Therefore, the customer service representative 34, 36, 38, or 40 may prepare to address the customer intent before interacting with the customer 18, which may reduce the time that it takes to solve a problem and/or complete a request of the customer 18.

At block 244, the customer 18 may be connected to the customer service representative 34, 36, 38, or 40 to initiate an interaction (e.g., a phone conversation, a video conference, a message chain, an e-mail, or other interaction) between the customer and the customer service representative 34, 36, 38, or 40. The time that it takes for the customer 18 to connect with the customer service representative 34, 36, 38, or 40 may be reduced when compared to systems that utilize automated voice systems because the customer's intent may be identified quickly and accurately, such that the customer 18 is directed to a suitable customer service representative 34, 36, 38, or 40 based on the identified intent. Accordingly, the suitable customer service representative 34, 36, 38, or 40 may be prepared to fully and adequately address the customer's problem and/or request.

In general, embodiments of the present disclosure are directed to a system and method to facilitate directing the customer 18 to the customer service representative 34, 36, 38, or 40 and to reduce the time that the customer 18 waits before resolving a problem and/or completing a request. Specifically, the time that the customer 18 waits before resolving the problem and/or completing the request may be reduced by authenticating the identity of the customer 18, determining the intent of the customer 18, and delivering information indicative of the intent of the customer 18 to a suitable customer service representative 34, 36, 38, or 40 before connecting the customer 18 with the customer service representative 34, 36, 38, or 40.

While only certain features of the disclosure have been illustrated and described herein, many modifications and changes will occur to those skilled in the art. It is, therefore, to be understood that the appended claims are intended to cover all such modifications and changes as fall within the true spirit of the present disclosure.

The invention claimed is:

1. A method, comprising:
    receiving customer identification information via a control system of a customer service system;
    verifying, via the control system, a customer identity using the customer identification information;
    receiving, via the control system, inputs related to customer intent with a predictive intent module of the control system by sending a signal to a customer device to display a prompt on the customer device that comprises one or more input boxes that enable a customer to select words and/or phrases, wherein the predictive intent module is configured to send a signal to the customer device to display a natural language skeleton on the customer device, wherein the natural language skeleton comprises one or more preset words and the one or more input boxes, and wherein the predictive intent module is configured to generate the words and/or phrases for selection in the one or more input boxes, such that the one or more preset words and the selected words and/or phrases from the one or more input boxes are configured to form a natural language sentence;
    receiving, via the control system, the natural language sentence from the customer device;
    predicting, via the control system, a specific intent with the predictive intent module based on a comparison between the customer identification information and the natural language sentence;
    processing, via the control system, the specific intent to select a customer service representative from a plurality of customer service representatives;
    delivering, via the control system, the inputs related to the customer intent to the customer service representative; and
    connecting, via the control system, the customer device to an additional device of the customer service representative to facilitate an interaction.

2. The method of claim 1, comprising predicting, via the control system, at least a portion of the selected words and/or phrases based on the customer identification information, customer information stored on a server, or a combination thereof.

3. The method of claim 1, wherein the customer identification information comprises a phone number received from the customer device, an e-mail address received from the customer device, an internet protocol (IP) address received from the customer device, a location received from the customer device, a recent activity performed by the customer and received from the customer device, or a combination thereof.

4. The method of claim 3, wherein verifying the customer identity using the customer identification information comprises comparing, via the control system, the phone number, the e-mail address, the IP address, the location, the recent activity, or the combination thereof, to a customer phone number, a customer e-mail address, a customer internet protocol (IP) address, customer location data, customer activity data, or a combination thereof from a database.

5. The method of claim 4, comprising sending, via the control system, an additional signal to the customer device to display an additional prompt that enables the customer to input additional customer identification information and comparing, via the control system, the additional customer identification information to customer information stored in the database.

6. The method of claim 1, wherein processing, via the control system, the specific intent comprises determining, via the control system, a category of the customer intent.

7. The method of claim 6, wherein selecting, via the control system, the customer service representative from the plurality of customer service representatives based on the specific intent comprises selecting, via the control system, the customer service representative associated with the category of the customer intent.

8. The method of claim 1, wherein delivering the inputs related to the customer intent to the customer service representative occurs before connecting the customer to the customer service representative to initiate the interaction.

9. A customer service management system, comprising:
    a database configured to store a plurality of customer data;
    a network configured to establish communication between the database and a customer device; and
    a control system communicatively coupled to the network, wherein the control system comprises one or more tangible, non-transitory machine readable media comprising executable instructions to:

receive customer identification information from the database, the customer device, or both;

verify a customer identity using the customer identification information;

receive inputs related to a customer intent from a predictive intent module, wherein the predictive intent module comprises a natural language intent system configured to display a natural language skeleton on the customer device, wherein the natural language skeleton comprises one or more preset words and one or more input boxes, and wherein the predictive intent module is configured to generate words and/or phrases for selection in the one or more input boxes, such that the one or more preset words and the words and/or phrases from the one or more input boxes are configured to form a natural language sentence;

predict a specific intent with the predictive intent module based on a comparison between the customer identification information and the natural language sentence;

select a customer service representative from a plurality of customer service representatives based on the predicted specific customer intent;

deliver the inputs related to the customer intent to a workstation of the customer service representative; and connect the customer device to the workstation of the customer service representative to initiate an interaction.

10. The system of claim 9, wherein the plurality of customer data stored on the database comprises customer financial events, customer family events, customer medical events, customer educational events, other customer information or customer events related, or a combination thereof.

11. The system of claim 9, wherein the customer device is a mobile phone.

12. A method, comprising:

receiving customer identification information from a customer device via a control system of a customer service system;

verifying, via the control system, a customer identity using the identification information;

sending, via the control system, a signal to a customer device to display a prompt on the customer device that enables a customer to select words and/or phrases, wherein the prompt comprises a natural language skeleton, wherein the natural language skeleton comprises one or more preset words and one or more input boxes, and wherein a predictive intent module of the control system is configured to generate the words and/or phrases for selection in the one or more input boxes, such that the one or more preset words and the words and/or phrases from the one or more input boxes are configured to form a natural language sentence;

receiving, via the control system, the natural language sentence from the customer device;

comparing, via the control system, the natural language sentence and the customer identification information to determine a category of customer intent with the predictive intent module;

selecting, via the control system, a customer service representative from a plurality of customer service representatives based on the category of the customer intent;

delivering, via the control system, the natural language sentence to an additional device of the customer service representative; and connecting, via the control system, the customer device to the additional device of the customer service representative to facilitate an interaction.

13. The method of claim 12, comprising sending, via the control system, an additional signal to the customer device to display an additional prompt on the customer device that enables the customer to select a general topic from a plurality of general topics.

* * * * *

UNITED STATES PATENT AND TRADEMARK OFFICE
CERTIFICATE OF CORRECTION

| | | |
|---|---|---|
| PATENT NO. | : 10,453,032 B1 | Page 1 of 1 |
| APPLICATION NO. | : 15/614179 | |
| DATED | : October 22, 2019 | |
| INVENTOR(S) | : Quincy Nanaasare Obeng et al. | |

It is certified that error appears in the above-identified patent and that said Letters Patent is hereby corrected as shown below:

In the Specification

1. In Column 5, Line 15, delete "database 16" and insert -- database 14 --, therefor.

2. In Column 5, Line 18, delete "server 20)." and insert -- server 16). --, therefor.

3. In Column 6, Line 60, delete "server 20" and insert -- server 16 --, therefor.

4. In Column 8, Line 25, delete "display 64" and insert -- display 68 --, therefor.

5. In Column 9, Line 2, delete "customer 22" and insert -- customer 18 --, therefor.

Signed and Sealed this
Seventeenth Day of December, 2019

Andrei Iancu
*Director of the United States Patent and Trademark Office*